Oct. 28, 1958 H. R. EGGERS 2,858,399
ELECTRICAL THERMOMETER
Filed May 9, 1955
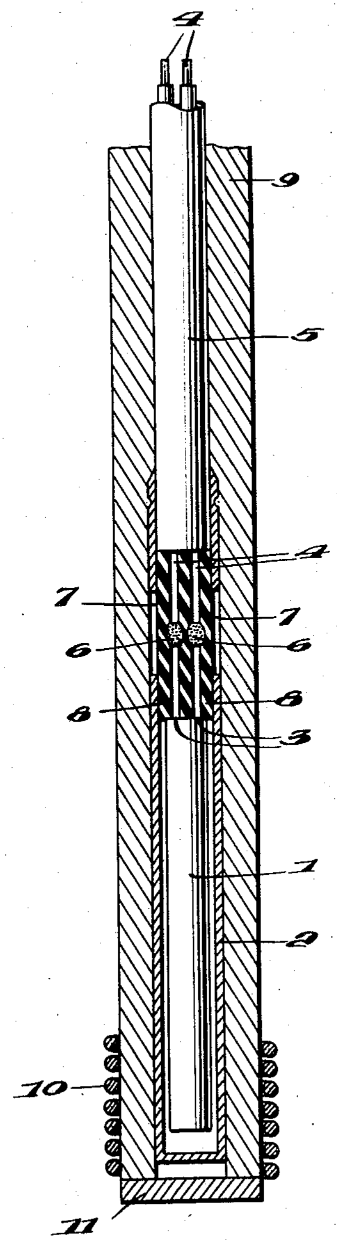
INVENTOR
Hermann Ragnar Eggers
BY Pierce, Scheffler & Parker
ATTORNEYS

1

2,858,399

ELECTRICAL THERMOMETER

Hermann Ragnar Eggers, Heiligenhaus, Germany, assignor to Licentia Patent-Verwaltungs-G. m. b. H., Hamburg, Germany Application May 9, 1955, Serial No. 506,943
In Germany August 3, 1949

Public Law 619, August 23, 1954
Patent expires August 3, 1969

2 Claims. (Cl. 201—63)

This invention relates to thermometers for use in grain silos and more particularly to electrical thermometers for such use.

It is known to measure the temperature in grain silos by the use of a multi-wire cable, which is armored with steel wire. If, for instance, it is desired to measure the temperature of a silo at three locations, sockets containing thermometer units are provided at points spaced along the cable, and a third socket containing a thermometer unit is provided at the end of the cable. With other arrangements, only a single socket containing a thermo-unit is provided at the end of the cable.

The disadvantage common to all known devices is the fact that the container of the thermo-unit has a diameter substantially larger than that of the cable, thereby offering a relatively large working surface of the forces exerted by the grain, forces which can become quite strong, particularly in case of cave-ins of hollow spaces formed by the grain, requiring excessive strengthening of the cable as well as of the connection between the thermo-unit container and the cable.

Objects of the present invention are to provide an electric thermometer for grain silos and similar places, in which the thermometer's thermal unit is of substantially the same diameter as the terminal cable, whereby the armor applied to the cable may extend over and enclose the thermal unit without increase in its diameter. Objects are to provide an electric thermometer of resistance bulb type which is enclosed within the same protective armor as the terminal cable to form a single smooth and continuous cable.

These and other objects and the advantages of the invention will be apparent from the following specification when taken with the accompanying drawing in which the single view is an elevation, with parts in section, of an electrical thermometer embodying the invention.

In the drawing, the reference numeral 1 identifies the case of a cylindrical resistance thermometer of any known or desired construction within a thin-walled tube 2 and having terminals 3 for connection of the wires 4 of a two-

2 wire cable 5 by solder 6. The cylindrical case 1 is of substantially the same diameter as the cable 5, and the upper end of the tube 2 is telescoped over the cable and provided with openings 7 for access to the terminals 3 and wire 4 for the soldering operation. After soldering, the space within the tube about the conductors is filled with insulating material 8, i. e. insulating tape or a self-hardening insulating plastic.

The insulating cable 5 is provided within an armor 9 which is wrapped at its end with wire 10 to prevent unwinding, and is slipped over the cable 5 and tube 2 after the connections to the resistance thermometer are made and the insulating material 8 is in place. The lower end of the armor 9 is closed by brazing or welding to a terminal plate 11.

I claim:

1. An electrical thermometer adapted to be suspended in granular materials to measure internal temperatures thereof comprising a cylindrical casing, a temperature responsive electrical resistance element within said casing having a pair of terminals extending therefrom, a cable colinearly arranged with respect to said casing and having two wires connected to the respective resistance element terminals, said cable and said cylindrical casing having outer diameters which are substantially equal, a protective cylindrically-uniform member completely housing said cylindrical casing and having an upper end telescoped over the lower end of said cable, and armor enclosing said cable and protective tube.

2. An electrical thermometer adapted to be suspended in granular materials to measure the internal temperatures thereof comprising a cylindrical casing, a temperature responsive electrical resistance element within said casing having a pair of terminals extending therefrom, a cable colinearly arranged with respect to said casing and having two wires soldered to the respective resistance element terminals, insulating material surrounding said cable wires and said resistance element terminals at their soldered connections, said cable, insulating material and cylindrical casing having outer diameters which are substantially equal, a protective cylindrically-uniform member completely housing said cylindrical casing and having an upper end telescoped over said insulating material and the lower end of said cable, and armor enclosing said cable and protective tube.

References Cited in the file of this patent

UNITED STATES PATENTS

| | | |
|---|---|---|
| 1,308,389 | Beaver et al. | July 1, 1919 |
| 2,379,317 | Picciano | June 26, 1945 |
| 2,526,251 | Medlar | Oct. 17, 1950 |
| 2,528,243 | Quinn | Oct. 31, 1950 |
| 2,672,493 | Tingle et al. | Mar. 16, 1954 |
| 2,749,753 | Adams | June 12, 1956 |